_(12)_ United States Patent
Min et al.

(10) Patent No.: US 8,647,790 B2
(45) Date of Patent: Feb. 11, 2014

(54) REPLACEMENT DEVICE FOR MEMBRANE-ELECTRODE ASSEMBLY OF FUEL CELL STACK WITH SEPARATORS HAVING RECESS PORTIONS

(75) Inventors: Myoung-Ki Min, Yongin-si (KR); Hee-Tak Kim, Yongin-si (KR); Geun-Seok Chai, Yongin-si (KR); Sang-Il Han, Yongin-si (KR); Tae-Yoon Kim, Yongin-si (KR); Sung-Yong Cho, Yongin-si (KR); Kah-Young Song, Yongin-si (KR)

(73) Assignee: Samsung SDI Co., Ltd (KR)

( * ) Notice: Subject to any disclaimer, the term of this patent is extended or adjusted under 35 U.S.C. 154(b) by 494 days.

(21) Appl. No.: 12/954,020

(22) Filed: Nov. 24, 2010

(65) Prior Publication Data

US 2011/0305966 A1   Dec. 15, 2011

(30) Foreign Application Priority Data

Jun. 10, 2010  (KR) ......................... 10-2010-0054943

(51) Int. Cl.
*H01M 8/24* (2006.01)
(52) U.S. Cl.
USPC ........................... 429/467; 429/452; 429/457

(58) Field of Classification Search
None
See application file for complete search history.

(56) References Cited

U.S. PATENT DOCUMENTS

2002/0058176 A1 * 5/2002 Wakahoi et al. ................ 429/34
2004/0229106 A1   11/2004 Yasumoto et al.

FOREIGN PATENT DOCUMENTS

| JP | 2004-134179 A | 4/2004 |
| JP | 2009-093970 A | 4/2009 |
| KR | 10-2004-0098530 A | 11/2004 |
| KR | 10-0859957 B | 9/2008 |

* cited by examiner

*Primary Examiner* — Ula C Ruddock
*Assistant Examiner* — Tony Chuo
(74) *Attorney, Agent, or Firm* — Knobbe Martens Olson & Bear LLP (57) ABSTRACT

A fuel cell stack including an electricity generating unit and a pair of end plates is disclosed. The electricity generating unit includes membrane-electrode assemblies and separators interposed between the membrane-electrode assemblies. The separators have recess portions formed on side faces thereof and may be configured to hold an external device for replacement of a single membrane-electrode assembly within the fuel cell stack. The end plates are located sandwiching the electricity generating unit by using fastening members to press the electricity generating unit.

7 Claims, 12 Drawing Sheets

REPLACEMENT DEVICE FOR MEMBRANE-ELECTRODE ASSEMBLY OF FUEL CELL STACK WITH SEPARATORS HAVING RECESS PORTIONS

CROSS-REFERENCE TO RELATED APPLICATIONS

This application claims priority to and the benefit of Korean Patent Application No. 10-2010-0054943, filed in the Korean Intellectual Property Office on Jun. 10, 2010, the entire contents of which are incorporated herein by reference.

BACKGROUND

1. Field of the Disclosure

The present disclosure relates to a fuel cell stack configured to allow easy replacement of a faulty membrane-electrode assembly. A replacement device for a membrane-electrode assembly of the fuel cell stack is also disclosed.

2. Description of the Related Technology

A fuel cell system includes a fuel cell stack configured for generating electric energy by an electrochemical reaction between a fuel (hydrocarbon fuel, pure hydrogen, or reformed gas rich in hydrogen) and an oxidant (air or pure oxygen). A direct oxidation fuel cell uses a liquid or gaseous hydrocarbon fuel. A polymer electrode fuel cell uses pure hydrogen or a reformed gas rich in hydrogen as a fuel.

The fuel cell stack includes membrane-electrode assemblies, separators interposed between the membrane-electrode assemblies, the separators configured to supply a fuel and an oxidant to the membrane-electrode assemblies, and a pair of end plates located outside the separators. The fuel cell stack is integrally assembled by fastening members. Each of the fastening members may consist of a tie bolt penetrating at least four corners of the fuel cell stack and a fixing nut fastened to an end of the tie bolt on the outside of the end plates and tightening the tie bolt.

If a problem occurs in one of the membrane-electrode assemblies of the fuel cell stack, the overall performance of the fuel cell stack is reduced. However, a single problematic membrane-electrode assembly cannot be easily identified and taken out of the fuel cell stack without testing each individual membrane-electrode assembly before assembling the fuel cell stack. Further, if a problem occurs with a specific membrane-electrode assembly after assembling the fuel cell stack, the entire membrane-electrode assembly has to be replaced. That is, the entire fuel cell stack must be disassembled and then reassembled in a cumbersome replacement process. Moreover, because dissembling and reassembling the fuel cell stack may damage other membrane-electrode assemblies the replacement operation must be carried out delicately.

SUMMARY OF CERTAIN INVENTIVE ASPECTS

In one aspect, a fuel cell stack configured to allow easy replacement of a faulty membrane-electrode assembly without affecting other membrane-electrode assemblies is provided.

In another aspect, a replacement device for a membrane-electrode assembly of the fuel cell stack is provided.

In another aspect, a fuel cell stack includes, for example, an electricity generating unit, a pair of end plates sandwiching the electricity generating unit, and fastening members mechanically connecting the pair of end plates so as to press the electricity generating unit. In some embodiments, the electricity generating unit includes a plurality of membrane-electrode assemblies and separators interposed between each of the membrane-electrode assemblies. In some embodiments, each of the separators includes two or more recess portions formed on side faces thereof and configured to temporarily hold an external device.

In some embodiments, each of the separators has a fuel channel formed on a first surface thereof and an oxidant channel formed on a second surface thereof. In some embodiments, the recess portions are disposed on either the first surface or the second surface of the separator. In some embodiments, the fuel channel and the oxidant channel are located in an effective area of the separator. In some embodiments, the recess portions are located outside the effective area. In some embodiments, the separators are formed in a rectangular shape. In some embodiments, the two or more recess portions are located on a long side edge and a short side edge of the separators. In some embodiments, the electricity generating unit and the pair of end plates are provided with a plurality of replacement holes in parallel with the thickness direction. In some embodiments, the replacement holes extend to the recess portions.

In another aspect, a system for replacing a membrane-electrode assembly of a fuel cell stack includes, for example, a fuel cell stack and a replacement device. In some embodiments, the fuel cell stack includes replacement holes penetrating a pair of end plates, membrane-electrode assemblies, separators and recess portions extending toward the replacement holes on side faces of the separators. In some embodiments, the replacement device includes a first tie member inserted into a portion of the replacement holes and fastened to a first portion of the fuel cell stack located on a first side of a replacement target of the fuel cell stack, and a second tie member inserted into a remaining portion of the replacement holes and fastened to a second portion of the fuel cell stack located on the other side of the replacement target.

In some embodiments, the first tie member includes a first bolt having a first opening near one end thereof, a first fixing pin inserted into the first opening through a first recess portion of a first separator located on the first side of the replacement target, and a first nut fastened to the first bolt. In some embodiments, the second tie member includes a second bolt having a second opening near one end thereof, a second fixing pin inserted into the second opening through a second recess portion of a second separator located on the second side of the replacement target, and a second nut fastened to the second bolt.

In some embodiments, the length of the first fixing pin is greater than the sum of the length of the first opening and the length of the recess portions. In some embodiments, the length of the second fixing pin is equal to the length of the first fixing pin. In some embodiments, the first bolt is longer than the second bolt. In some embodiments, the length of the first bolt is equal to the thickness of the fuel cell stack. In some embodiments, the length of the second bolt is half the length of the first bolt. In some embodiments, the first tie member includes a first outer bolt fitted into the portion of the replacement holes, a first inner bolt screwed into the first outer bolt, and a third fixing pin installed near one end of the first outer bolt by a first elastic member. In some embodiments, the second tie member includes a second outer bolt fitted into the remaining portion of the replacement holes, a second inner bolt screwed into the second outer bolt, and a fourth fixing pin installed near one end of the second outer bolt by a second elastic member. In some embodiments, the first outer bolt is longer than the second outer bolt. In some embodiments, the length of the first outer bolt is equal to the thickness of the fuel cell stack. In some embodiments, the length of the second outer bolt is half the length of the first outer bolt.

In another aspect, a system for replacing a membrane-electrode assembly of a fuel cell stack includes, for example, a fuel cell stack having recess portions formed on side faces of separators interposed between membrane-electrode assemblies and a replacement device. In some embodiments, the replacement device includes, for example, fifth fixing pins disposed on the outside of the fuel cell stack to face the recess portions, a first moving unit coupled to the fifth fixing pins and moving the fifth fixing pins forward or backward toward the fuel cell stack, and a second moving unit coupled to the first moving unit and moving the fifth fixing pins along the thickness direction of the fuel cell stack.

In some embodiments, the first moving unit includes a support frame and driving cylinders installed on the support frame and configured to support the fifth fixing pins. In some embodiments, the second moving unit includes feed screws penetrating the support frame and mechanically connecting with the support frame. In some embodiments, the second moving unit further includes driving motors coupled to the feed screws. In some embodiments, the feed screws are vertically installed on a bottom base. In some embodiments, the replacement device for a membrane-electrode assembly further includes guide bars installed on the bottom base. In some embodiments, guide grooves are formed on inner sides of the support frame.

In another aspect, a membrane-electrode assembly having a problem can be easily replaced using a replacement device by forming either recess portions or recess portions and replacement holes in a fuel cell stack. Moreover, since membrane-electrode assemblies other than a replacement target are stably interposed between the separators in the replacement process, the effects on the other membrane-electrode assemblies in the replacement process can be minimized.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. Certain embodiments will be described in more detail with reference to the accompanying drawings, so that a person having ordinary skill in the art can readily make and use aspects of the present disclosure.

Figure 1:
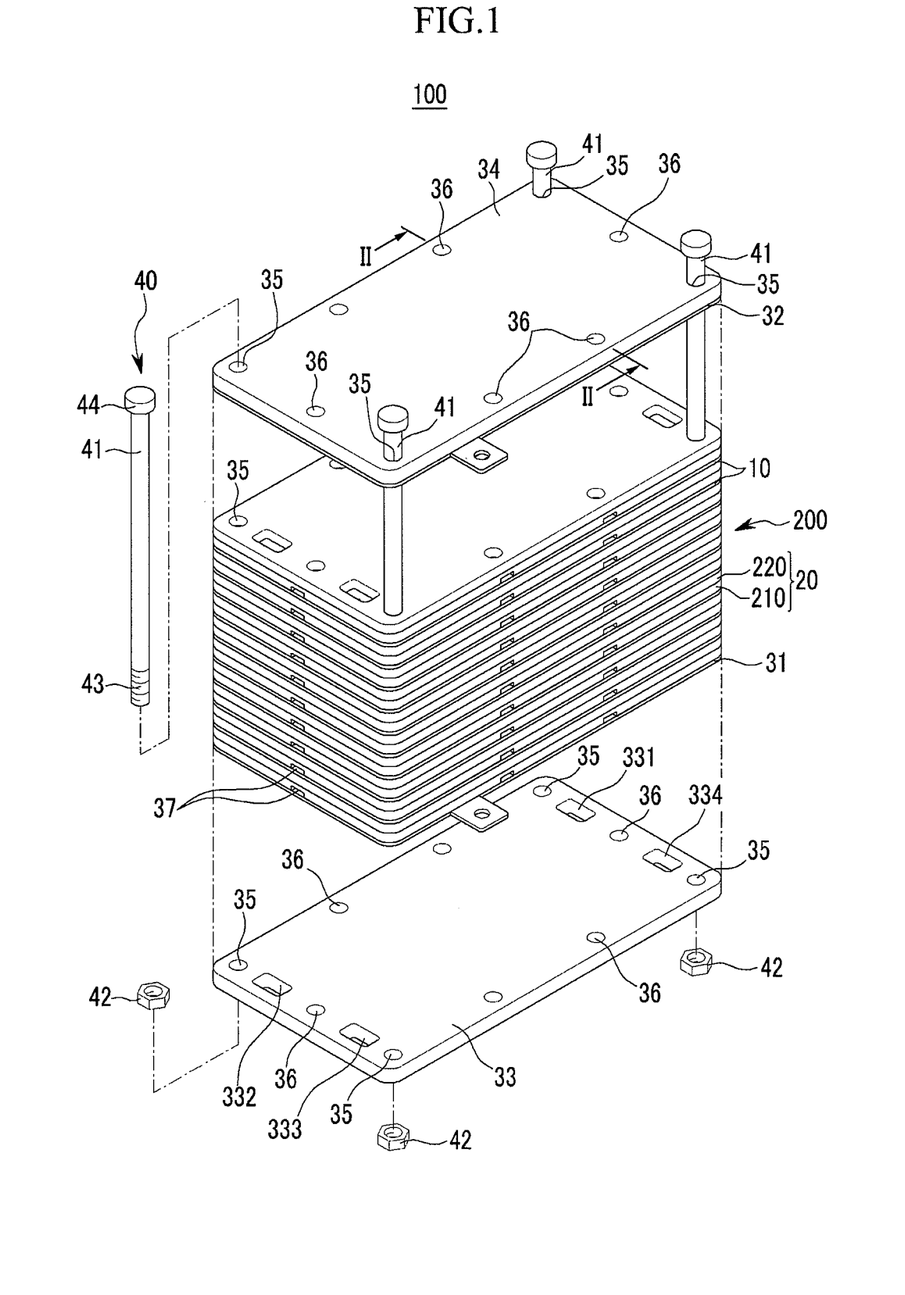
FIG. 1 is an exploded perspective view of a fuel cell stack according to a first exemplary embodiment.

FIG. 1 is an exploded perspective view of a fuel cell stack according to a first exemplary embodiment. Referring to FIG. 1, the fuel cell stack 100 of the first exemplary embodiment includes an electricity generating unit 200, first and second current collecting plates 31 and 32 located on outer sides of the electricity generating unit 100, first and second end plates 33 and 34 located on outer sides of the first and second current collecting plates 31 and 32, and fastening members 40.

The electricity generating unit 200 includes membrane-electrode assemblies 10 and separators 20 interposed between the membrane-electrode assemblies 10. In operation, the membrane-electrode assemblies 10 are configured to receive a fuel and an oxidant through the separators 20, and are configured to generate electric energy by an electrochemical reaction between the fuel and the oxidant. The separators 20 are formed of a solid conductive material, such as a metal or carbon complex. The separators 20 are configured to support the membrane-electrode assemblies 10 and are configured to electrically connect the membrane-electrode assemblies 10.

In operation, the first and second current collecting plates 31 and 32 are configured to collect currents generated by the electricity generating unit 100 and transmit the currents to a power converter (not shown) outside the fuel cell stack 100. The first and second end plates 33 and 34 are located on the outermost side of the fuel cell stack 100, and are integrally assembled by the fastening members 40 to maintain a laminated state of the electricity generating unit 200.

Each of the fastening members 40 may include, for example, a tie bolt 41 penetrating the first and second end plates 33 and 34, the first and second current collecting plates 31 and 32, and at least four corners of the electricity generating unit 200, and a fixing nut 42 fastened to an end of the tie bolt 41 on the outer side of one end plate and tightening the tie bolt 41. The tie bolt 41 may have a length greater than the thickness of the fuel cell stack 100. The tie bolt 41 may include a screw thread 43 formed on an end thereof to which the fixing nut 42 is fitted. When the head 44 of the tie bolt 41 is located on the outside of the second end plate 34, the fixing nut 42 is closely attached to the first end plate 33.

The first and second end plates 33 and 34, the first and second current collecting plates 31 and 32, and the electricity generating unit 200 may include a plurality of fastening holes 35, which are formed along the thickness direction of the fuel cell stack 100 and are configured to receive the tie bolts 41. Although FIG. 1 illustrates that the fastening holes 35 are formed on four corners of the fuel cell stack 100, the positions and number of the fastening holes 35 are not limited to the illustrated example, but may be varied in many ways. Moreover, although FIG. 1 illustrates a fastening member 40 including the tie bolt 41 and the fixing nut 42, the fastening member 40 is not limited to the illustrated example, but any structure that can give a fastening force to the fuel cell stack 100 may be applied.

A fuel injection port 331, an oxidant injection port 332, a fuel exhaust port 333, and an oxidant exhaust port 334 are formed in either one or both of the first end plate 33 and the second end plate 34. For example, as illustrated in FIG. 1, the fuel injection port 331, the oxidant injection port 332, the fuel exhaust port 333, and the oxidant exhaust port 334 are formed in the first end plate 33. In other embodiments, the fuel injection port 331 and the oxidant injection port 332 may be formed in either one of the first end plate 33 and the second end plate 34, and the fuel exhaust port 333 and the oxidant exhaust port 334 may be formed in the other end plate.

Figure 2:
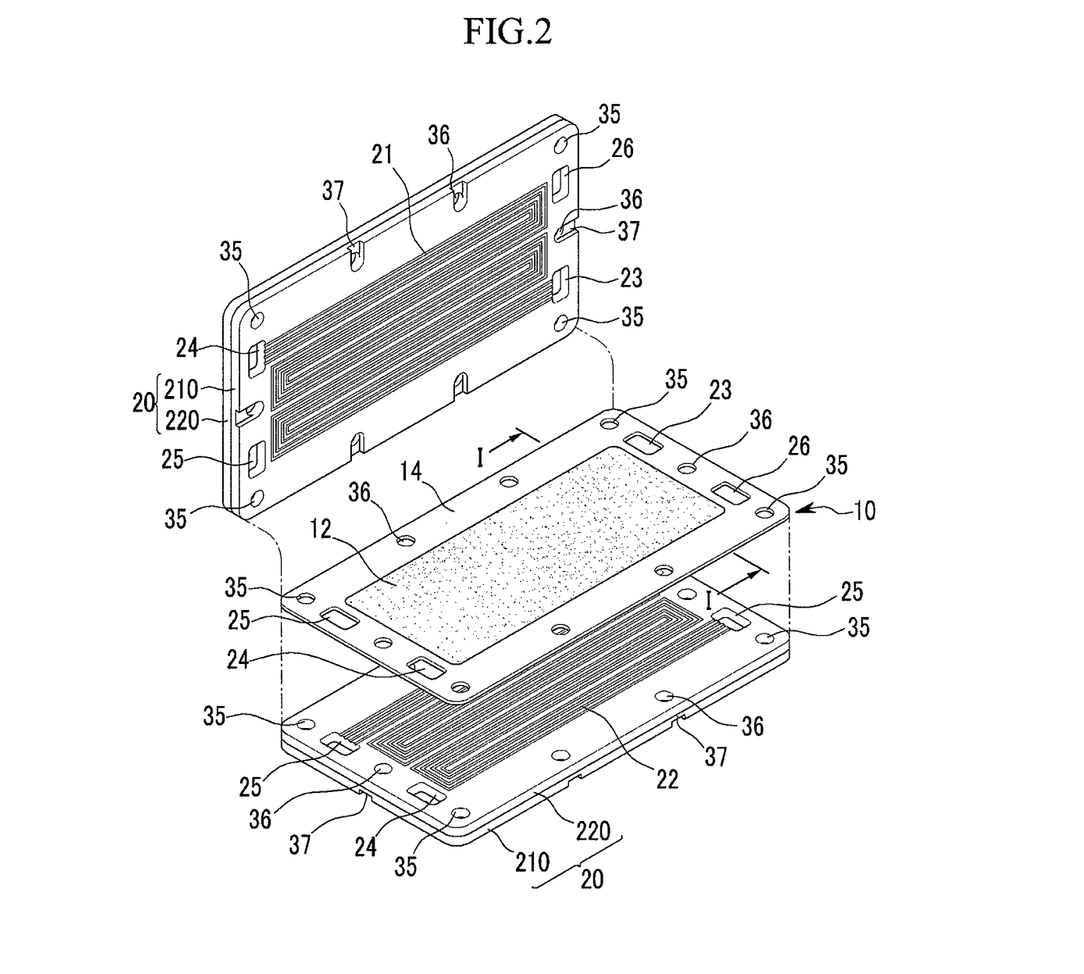
FIG. 2 is an exploded perspective view showing one membrane-electrode assembly and two separators of the fuel cell stack shown in FIG. 1.
Figure 3:
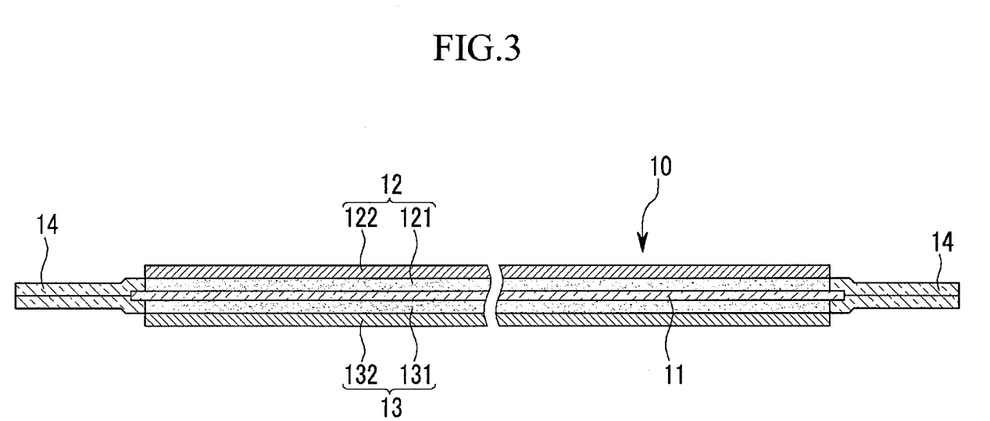
FIG. 3 is a cross-sectional view of the membrane-electrode assembly cut alone line I-I of FIG. 2.

FIG. 2 is an exploded perspective view showing one membrane-electrode assembly and two separators of the fuel cell stack shown in FIG. 1. FIG. 3 is a cross-sectional view of the membrane-electrode assembly cut alone line I-I of FIG. 2. Referring to FIGS. 2 and 3, the membrane-electrode assembly 10 includes an electrolyte membrane 11, an anode 12 formed on one surface of the electrolyte membrane 11, a cathode 13 formed on the other surface of the electrolyte membrane 11, and a support film 14 secured to the periphery of the electrolyte membrane 11.

In operation of the fuel cell system, the anode 12 is supplied with a fuel. The anode 12 includes a catalyst layer 121 configured for converting hydrogen in the fuel into electrons and hydrogen ions by an oxidation reaction and a gas diffusion layer 122 covering the catalyst layer 121. In operation of the fuel cell system, the cathode 13 is supplied with an oxidant. The cathode 13 includes a catalyst layer 131 configured for converting oxygen in the oxidant into electrons and oxygen ions by a reduction reaction and a gas diffusion layer 132 covering the catalyst layer 131.

The electrolyte membrane 11 includes an ion exchange function to transfer hydrogen ions generated in the anode 12 to the cathode 13. The support film 14 is configured to suppress the expansion and contraction of the electrolyte membrane 11 due to moisture absorption. The support film 14 includes fastening holes 35 formed on at least four corners configured to allow the tie bolts 41 to penetrate the membrane-electrode assembly 10.

Each of the separators 20 may be divided into an anode separator 210 in proximity to or attached to the anode 12 and a cathode separator 220 in proximity to or attached to the cathode 13. The anode separator 210 includes a fuel channel 21 formed on one surface facing the anode 12. The cathode separator 220 includes an oxidant channel 22 formed on one surface facing the cathode 13. An area of the separator 20 where the fuel channel 21 and the oxidant channel 22 are formed is referred to as an effective area. The anode separator 210 and the cathode separator 220 may be integrally secured. In a configuration where the anode separator 210 and the cathode separator are integrally secured they are called bipolar plates.

As depicted in FIG. 2, a fuel inlet manifold 23, a fuel outlet manifold 24, an oxidant inlet manifold 25 and an oxidant outlet manifold 26 are formed on an outer side of the effective area of the separator 20 and the support film 14 corresponding thereto. The fuel inlet manifold 23 and the fuel outlet manifold 24 are respectively formed at positions on the membrane-electrode assemblies corresponding to positions of the fuel injection port 331 and the fuel exhaust port 333 formed on the first end plate 33. The oxidant inlet manifold 25 and the oxidant outlet manifold 26 are respectively formed at positions on the membrane-electrode assemblies corresponding to positions of the oxidant injection port 332 and the oxidant exhaust port 334 formed on the first end plate 33.

In operation of the fuel cell stack, the fuel supplied to the fuel injection port 331 may be distributed to the fuel channels 21 of the separators 20 via the fuel inlet manifold 23 and simultaneously be supplied to the anodes 12 of the membrane-electrode assemblies 10. The oxidant supplied to the oxidant injection port 332 may be distributed to the oxidant channels 22 of the separators 20 via the oxidant inlet manifold 25 and simultaneously be supplied to the cathodes 13 of the membrane-electrode assemblies 10. Accordingly, electrical energy is generated by an electrochemical reaction between the fuel and the oxidant in the membrane-electrode assemblies 10.

Fuel not used for the electrochemical reaction of the membrane-electrode assemblies 10 (unreacted fuel) passes through the fuel outlet manifold 24 and is exhausted out of the fuel cell stack 100 via the fuel exhaust port 333. An unreacted oxidant not used for the electrochemical reaction of the membrane-electrode assemblies 10 together with moisture generated as a by-product of the electrochemical reaction of the membrane-electrode assemblies 10 pass through the oxidant outlet manifold 26 and are exhausted out of the fuel cell stack 100 via the oxidant exhaust port 334.

Figure 4:
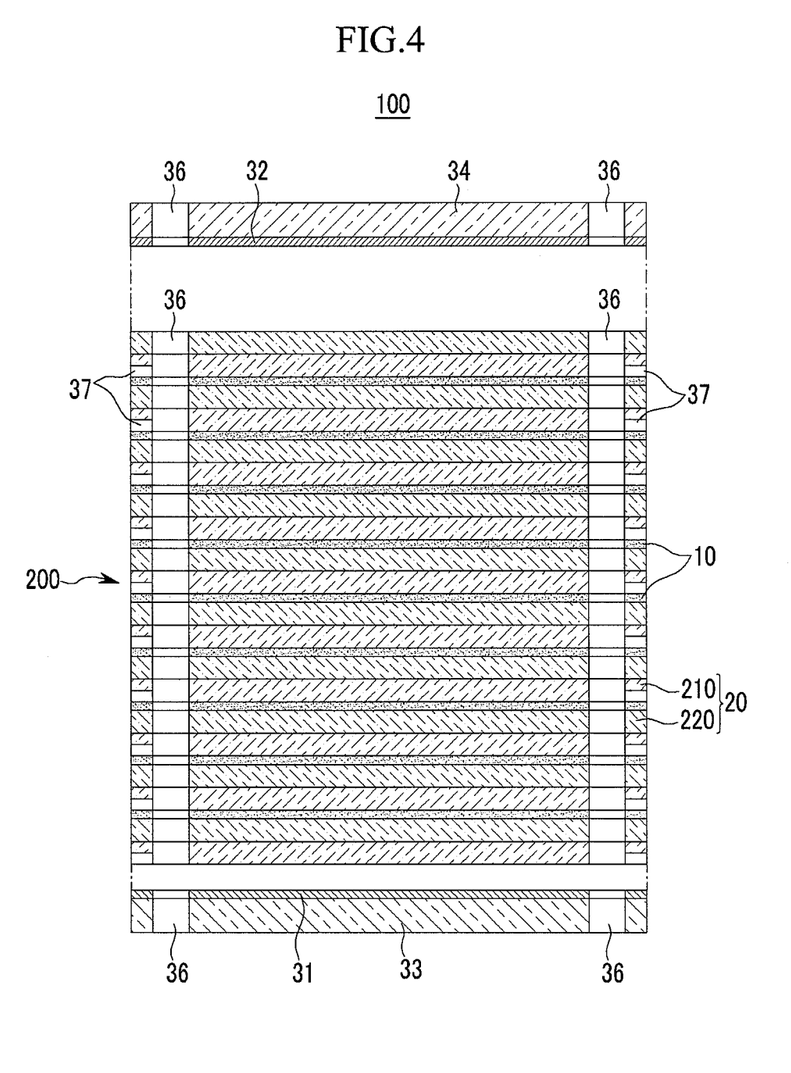
FIG. 4 is a cross-sectional view of the fuel cell stack cut along line II-II of FIG. 1.

During the above operation of the fuel cell stack 100, if a fault occurs to one of the membrane-electrode assemblies 10, the performance of the fuel cell stack 100 suffers until the problem membrane-electrode assembly is replaced. As illustrated in FIGS. 1, 2 and 4, the fuel cell stack 100 is provided with replacement holes 36 and recess portions 37 so as to allow easy replacement of a membrane-electrode assembly 10. The replacement holes 36 and the recess portions 37 are configured to temporarily hold an external device (replacement device) for replacement of the membrane-electrode assembly 10 and combine the external device and the fuel cell stack 100.

FIG. 4 is a cross-sectional view of the fuel cell stack cut along line II-II of FIG. 1. In FIG. 4, illustration of the fuel channels and oxidant channels formed on the separators is omitted for convenience. Referring to FIGS. 2 and 4, replacement holes 36 are formed in the electricity generating unit 200 at the first and second current collecting plates 31 and 32 and the first and second end plates 33 and 34. The replacement holes 36 at the electricity generating unit 200 are formed on outer sides of the effective areas of the separators 20 and the support films corresponding thereto. The replacement holes 36 penetrate the fuel cell stack 100 in the thickness direction of the fuel cell stack 100.

A plurality of replacement holes 36 is formed along the edges of the fuel cell stack 100. For example, one or more replacement holes 36 may be formed on one of the two long side edges of the fuel cell stack 100, and one or more replacement holes 36 may be formed on one of the two short side edges thereof. FIGS. 2 and 4 illustrate an example in which two replacement holes 36 are formed on each of the two long side edges of the fuel cell stack 100, and one replacement hole 36 is formed on each of the two short side edges thereof.

As illustrated in FIGS. 1, 2, and 4, the recess portions 37 may be formed on side faces of each separator 20 and may be recessed to a predetermined depth in one surface of each separator 20. That is, one or more recess portions 37 may be formed on one of the two long side faces of the separator 20, and one or more recess portions 37 may be formed on one of the two short side faces thereof.

FIGS. 2 and 4 illustrate an example in which two recess portions 37 are formed on each of the two long side faces of the separator 20, and one recess portion 37 is formed on each of the two short side faces thereof.

The recess portions 37 are formed to connect the replacement holes 36 and the side faces of the separator 20. That is, the recess portions 37 linearly extend from the replacement holes 36 toward the side faces of the separator 20 closest thereto, thereby mechanically connecting the outer space of the fuel cell stack 100 and the replacement holes 36. The recess portions 37 may be formed in the top or bottom surface of each separator 20 and may be formed in various shapes, such as a rectangle, a circle, etc. FIGS. 2 and 4 illustrate an example in which rectangular recess portions 37 are formed in the bottom surface of each separator 20.

Figure 5:
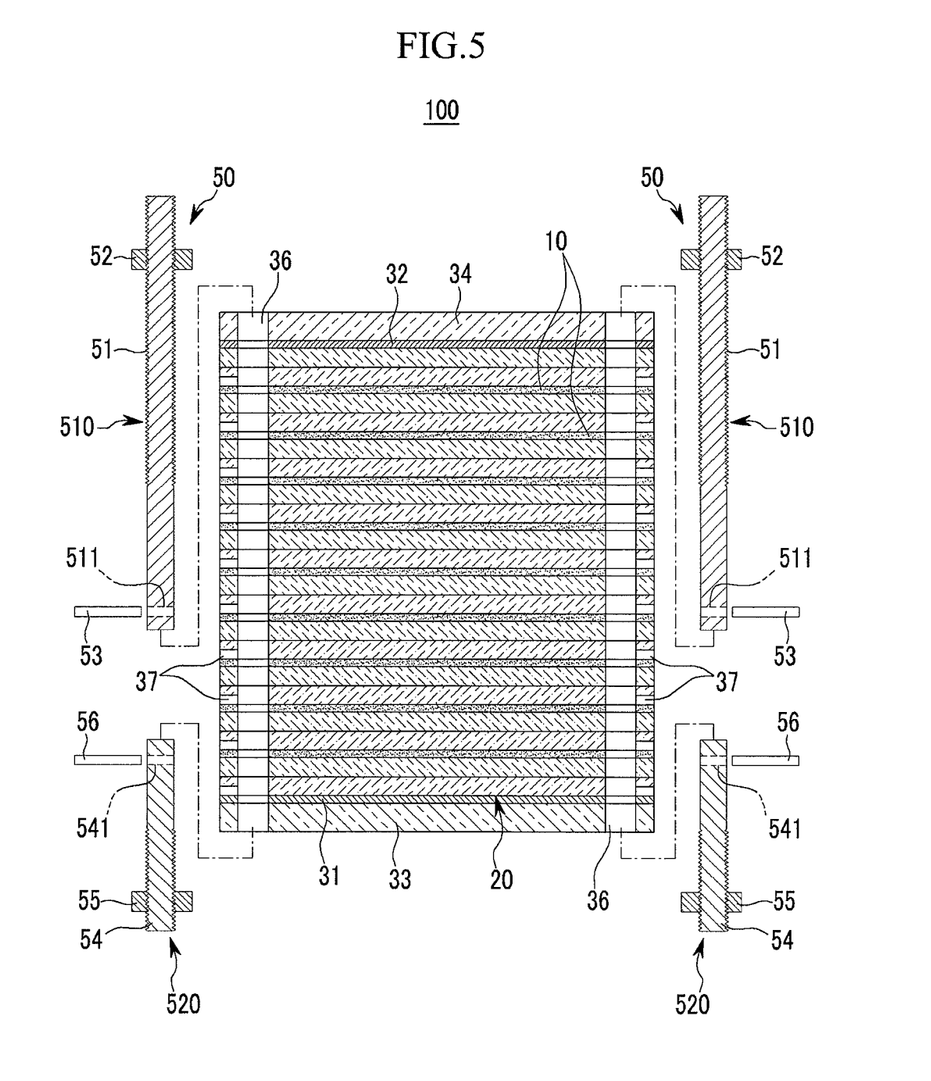
FIG. 5 is a cross-sectional view similar to the cross-sectional view of a fuel cell stack shown in FIG. 4 together with a replacement device for a membrane-electrode assembly according to the first exemplary embodiment.

FIG. 5 is a cross-sectional view similar to the cross-sectional view of the fuel cell stack of FIG. 4. FIG. 5 illustrates a replacement device for a membrane-electrode assembly according to the first exemplary embodiment. Referring to FIG. 5, the replacement device 50 for a membrane-electrode assembly (hereinafter referred to as "replacement device") includes a first tie member 510 including a first bolt 51, a first nut 52, and a first fixing pin 53, and a second tie member 520 including a second bolt 54, a second nut 55, and a second fixing pin 56. The same number of replacement devices 50 is provided as the number of the replacement holes 36. The first tie members 510 and the second tie member 520 are allocated for each of the replacement holes 36.

The length of the first bolt 51 may be equal to the thickness of the fuel cell stack 100. The length of the second bolt 54 may be half the length of the first bolt 51. The first and second bolts 51 and 54 may have screw threads formed at portions of outer circumferential surfaces extending from the ends, respectively. The first and second nuts 52 and 55 are fitted on the screw threads on opposite ends of the first and second bolts 51 and 54, respectively. The first bolt 51 includes a first opening 511 configured for insertion of the first fixing pin 53. The second bolt 54 includes a second opening 541 for insertion of the second fixing pin 56. The first opening 511 and the second opening 541 are formed on the first and second bolts, respectively, are formed near ends at which the screw threads are not formed.

The first opening 511 and the second opening 541 are formed in parallel with the recess portions 37 provided in the fuel cell stack 100. The first fixing pin 53 is formed having a greater length than the sum of the length of the first opening 511 and the length of the recess portions 37. The second fixing pin 56 is formed having the same length as the first fixing pin 53. The first bolt 51 and the second bolt 54 have a slightly smaller size than the replacement holes 36 in consideration of a fit tolerance. The first fixing pin 53 and the second fixing pin 56 have a slightly smaller size than the first opening 511 and the second opening 541 in consideration of a fit tolerance.

Figure 6:
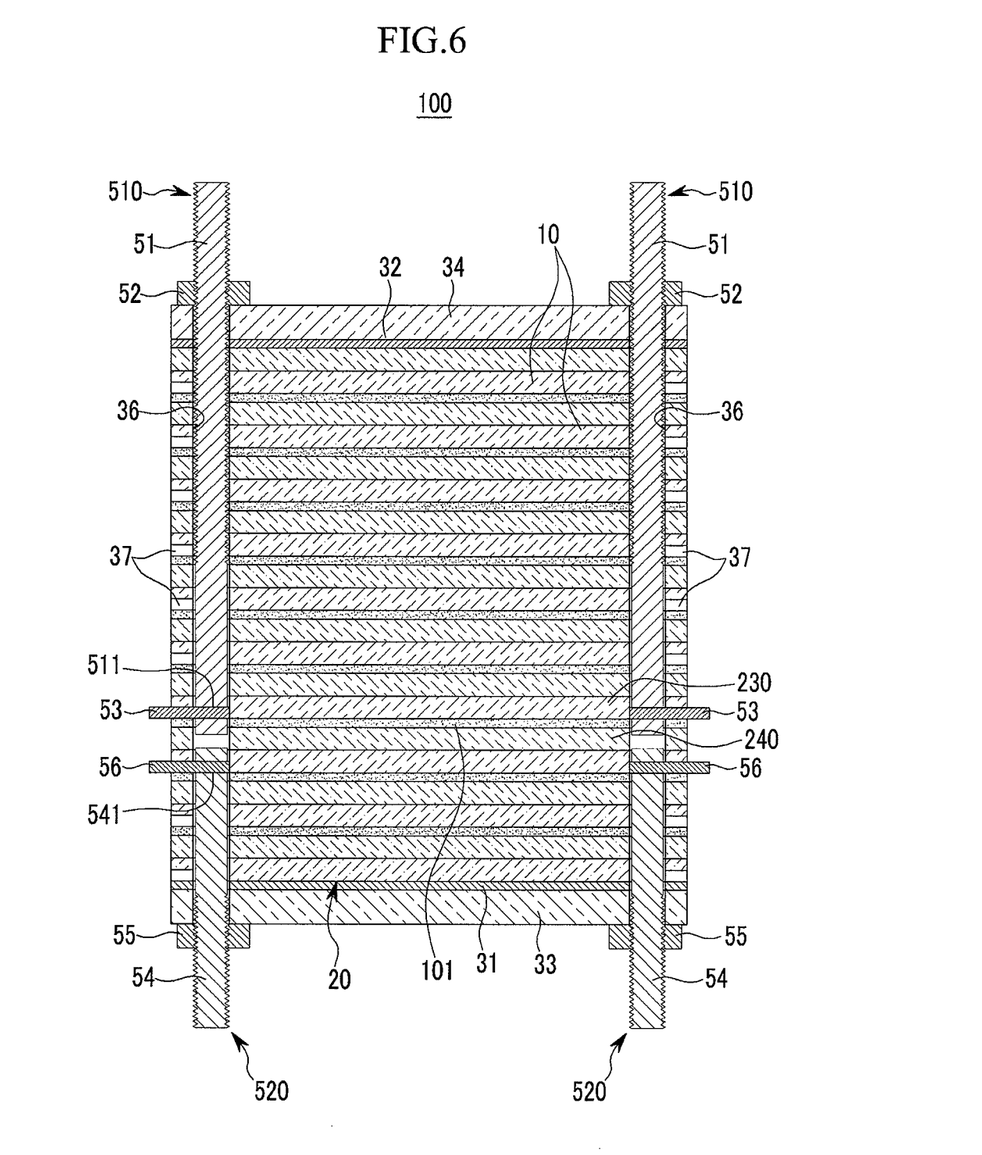
FIG. 6 is a cross-sectional view of a fuel cell stack depicting a process of replacing a membrane-electrode assembly using the replacement device according to the first exemplary embodiment.
Figure 7:
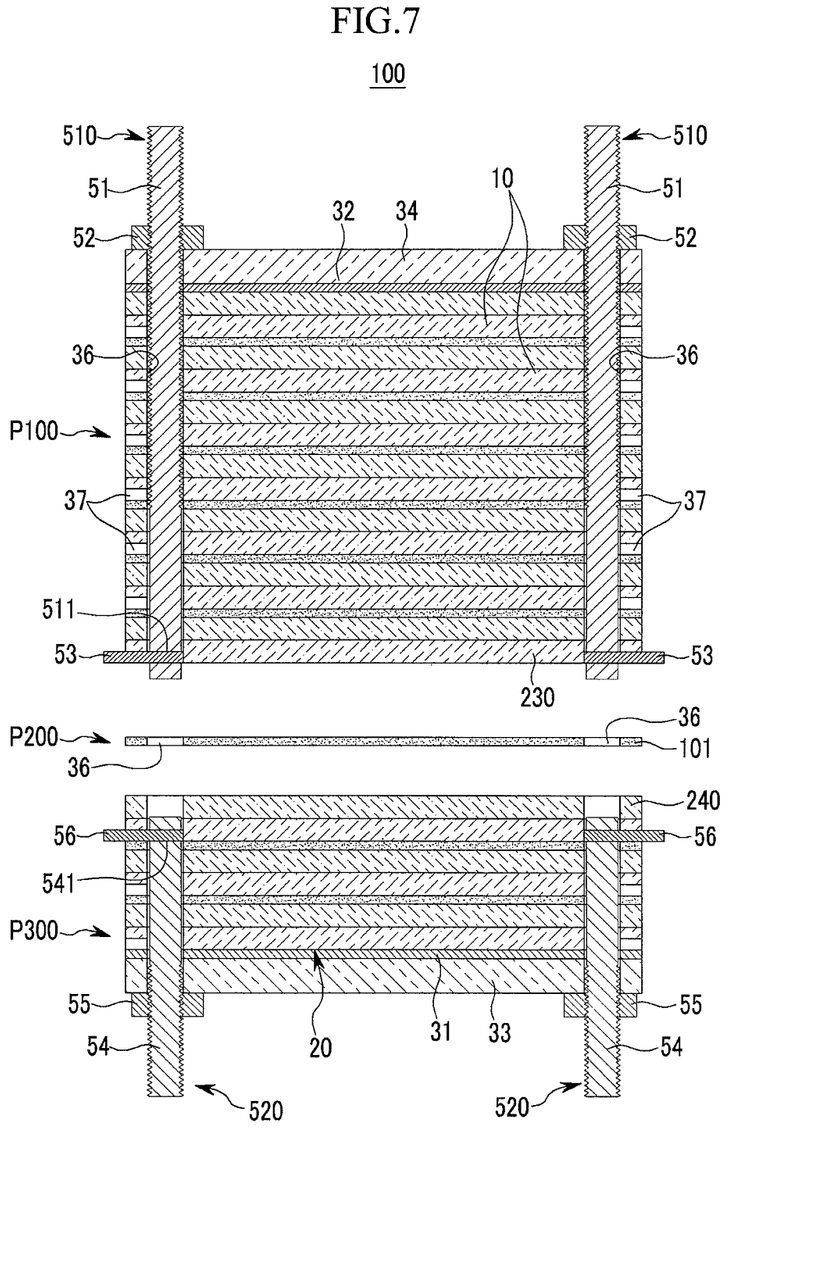
FIG. 7 is a cross-sectional view of a fuel cell stack depicting a process of replacing a membrane-electrode assembly using the replacement device according to the first exemplary embodiment.

FIGS. 6 and 7 are cross-sectional views of a fuel cell stack illustrating a process of replacing a membrane-electrode assembly using the replacement device according to the first exemplary embodiment. For better understanding and ease of description, a membrane-electrode assembly 10 to be replaced is designated as a replacement target 101 and separators located on either side of the replacement target 101 are designated as a first separator 230 and a second separator 240, respectively. With reference to FIGS. 6 and 7, the first separator 230 is located immediately above the replacement target 101 and the second separator 240 is located immediately below the replacement target 101.

Referring to FIGS. 6 and 7, if the replacement target 101 is located closer to the first end plate 33 than to the second end plate 34, the first bolt 51 is fitted into the replacement holes 36 on the outer side of the second end plate 34. When the first opening 511 of the first bolt 51 reaches the same position as the recess portions 37 of the first separator 230, the first fixing pin 53 is inserted into the first opening 511 through the recess portions 37 to fix the position of the first bolt 51. Next, the first nut 52 is tightened until it is proximate to or in contact with an outer surface of the second end plate 34.

Similarly, the second bolt 54 is fitted into the replacement holes 36 on the outer side of the first end plate 33. When the second opening 541 of the second bolt 54 reaches the same position as the recess portions 37 of the second separator 240, the second fixing pin 56 is inserted into the second opening 541 through the recess portions 37 to fix the position of the second bolt 51. Next, the second nut 55 is tightened until it is proximate to or in contact with an outer surface of the first end plate 33.

Accordingly, portions of the fuel cell stack 100 located on one side (upper portion in the drawings) of the replacement target 101 are integrally assembled by the first tie members 510, and portions of the fuel cell stack 100 located on the other side (lower portion in the drawings) of the replacement target 101 are integrally assembled by the second tie members 520. At this point, the fastening force that the first and second tie members 510 and 520 apply to the fuel cell stack 100 may be equal to the fastening force that the fastening members 40 apply to the fuel cell stack 100.

Next, the fixing nuts 42 of the fastening members 40 (illustrated, for example, in FIG. 1) are removed from the tie bolts 41, and the fuel cell stack 100 is divided into three parts. That is, as illustrated in FIG. 7, the fuel cell stack 100 is divided into a first part P100 assembled by the first tie members 510, a second part P200 which is the replacement target 101, and a third part P300 assembled by the second tie members 520. The replacement target 101 may then be replaced with a new membrane-electrode assembly, and the fuel cell stack 100 may be reassembled using the fastening members 40. Finally, the first tie members 510 and the second tie members 520 are dissembled and removed from the fuel cell stack 100.

If the replacement target 101 is located closer to the second end plate 34 than to the first end plate 33, the first bolt 51 is fitted into the replacement holes 36 on the outer side of the first end plate 33, and the second bolt 54 is fitted into the replacement holes 36 on the outer side of the second end plate 34. The replacement process of the membrane-electrode assembly is then carried out in the same manner as the above-described process.

Figure 8:
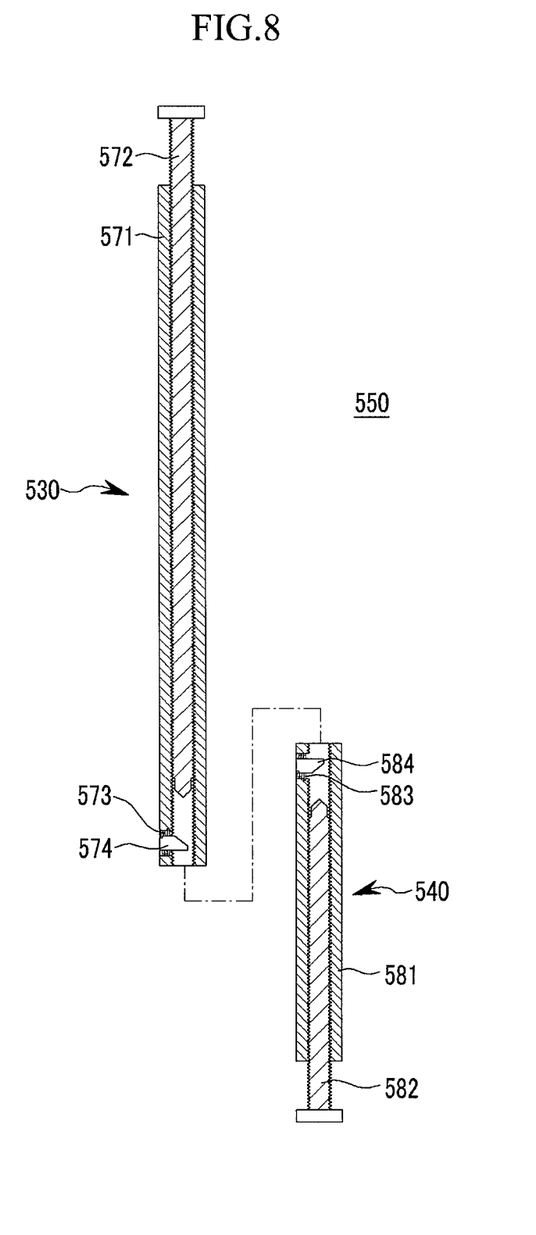
FIG. 8 is a cross-sectional view showing a replacement device for a membrane-electrode assembly according to a second exemplary embodiment.

FIG. 8 is a cross-sectional view showing a replacement device for a membrane-electrode assembly according to a second exemplary embodiment. Referring to FIG. 8, the replacement device 550 includes a first tie member 530 having a first outer bolt 571, a first inner bolt 572, a first elastic member 573, and a third fixing pin 574. The replacement device 550 also includes a second tie member 540 having a second outer bolt 581, a second inner bolt 582, a second elastic member 583, and a fourth fixing pin 584. The same number of replacement devices 550 is provided as the number of replacement holes of the fuel cell stack. The first tie members 530 and the second tie members 540 are allocated for each of the replacement holes 36.

As the first inner bolt 572 is screwed into the first outer bolt 571, the first inner bolt 572 and the first outer bolt 571 constitute a double bolt. Similarly, as the second inner bolt 582 is screwed into the second outer bolt 581, the second inner bolt 582 and the second outer bolt 581 constitute a double bolt.

The first outer bolt 571 has an opening formed near one end thereof, and the first elastic member 573 and the third fixing ping 574 are installed in the opening. Similarly, the second outer bolt 581 has an opening near one end thereof, and the second elastic member 583 and the fourth fixing pin 584 are installed in the opening. The length of the first outer bolt 571 may be equal to the thickness of the fuel cell stack. The length of the second outer bolt 581 may be half the length of the first outer bolt 571.

When the first outer bolt 571 is fitted into some portion of the replacement holes and the first inner bolt 572 is tightened, the first inner bolt 572 pushes the third fixing pin 574 so that the third fixing pin 574 protrudes out of the first outer bolt 571. Similarly, when the second outer bolt 581 is fitted into the remaining portion of the replacement holes and the second inner bolt 582 is tightened, the second inner bolt 582 pushes the fourth fixing pin 584 so that the fourth fixing pin 584 protrudes out of the second outer bolt 581. Accordingly, the third fixing pin 574 and the fourth fixing pin 584, respectively, are configured to perform the same functions as the first fixing pin 53 and second fixing pin 56 of the foregoing first exemplary embodiment.

After replacing the membrane-electrode assembly, when the first inner bolt 572 is unscrewed from the first outer bolt 571 and the second inner bolt 582 is unscrewed from the second outer bolt 581, the third fixing pin 574 returns to the original position by the first elastic member 573, and the fourth fixing pin 584 returns to the original position by the second elastic member 583.

Figure 9:
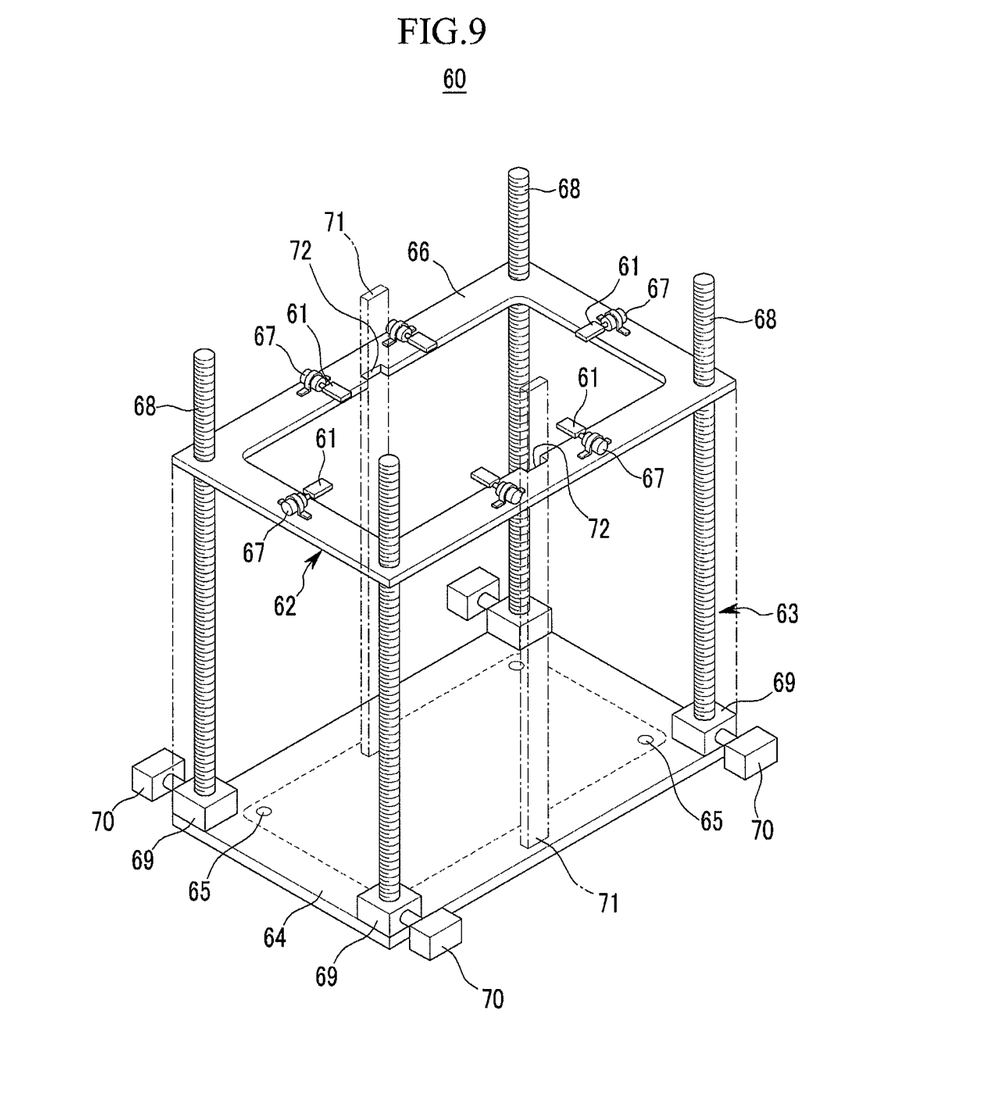
FIG. 9 is a perspective view showing a replacement device for a membrane-electrode assembly according to a third exemplary embodiment.

FIG. 9 is a perspective view showing a replacement device for a membrane-electrode assembly according to a third exemplary embodiment. Referring to FIG. 9, the replacement device 60 includes fifth fixing pins 61, a first moving unit 62 coupled to the fifth fixing pins 61 and configured to move the fifth fixing pins 61 in a back and forth direction, and a second moving unit 63 coupled to the first moving unit 62 and configured to move the fixing pins 61 in an up-and-down direction. Here, the back-and-forth direction indicates a direction that becomes distant from or close to the fuel cell stack 100, and the up-and-down direction indicates a thickness direction of the fuel cell stack 100.

A bottom base 64 is configured for supporting the fuel cell stack 100 and is located below the replacement device 60. The bottom base 64 includes through holes 65 formed at positions corresponding to the fastening members 40 (see, for example, FIG. 1) so that the fixing nuts 42 of the fastening members 40 may be exposed out of the bottom base 64.

The first moving unit 62 includes a support frame 66 and driving cylinders 67, which are installed on the support frame 66 and are configured to support the fifth fixing pins 61. The inner space of the support frame 66 is larger than the width of the fuel cell stack 100. The positions of the driving cylinders 67 and the fifth fixing pins 61 correspond to the recess portions 37 formed in the fuel cell stack 100 illustrated in FIG. 1. The fifth fixing pins 61 are configured to move in the back and forth direction by the operation of the driving cylinders 67.

The second moving unit 63 includes feed screws 68 installed on the bottom base 64 and penetrating edge portions on the corners of the support frame 66 configured to mechanically connect with the support frame 66. The second moving unit 63 also includes gear boxes 69 and driving motors 70 installed at ends of the feed screws 68. Inside each of the gear boxes 69 is installed a bearing configured for supporting the feed screw 68 and a reduction gear.

The support frame 66 ascends or descends along the rotational direction of the feed screws 68 to move the fifth fixing pins 61 in the up-and-down direction. At this point, guide bars 71 may be vertically installed on the bottom base 64 so as to smoothly guide the up-and-down movement of the support frame 66. Also, guide grooves 72 for receiving the guide bars may be formed with a predetermined sliding tolerance on inner sides of the support frame 66.

Figure 10:
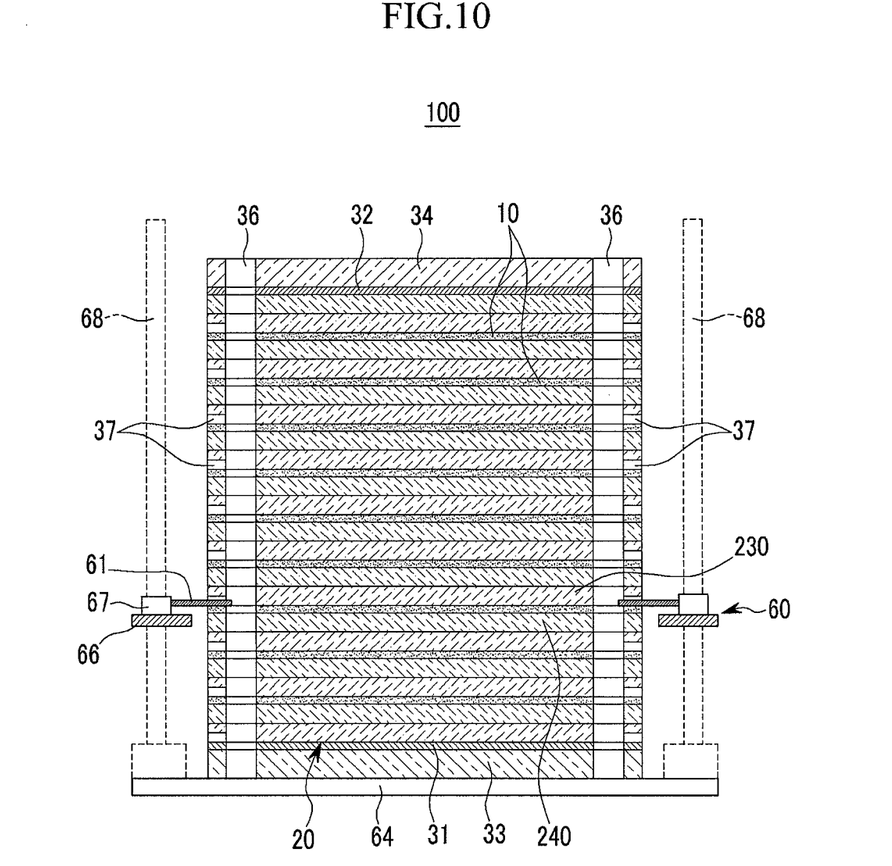
FIG. 10 is a cross-sectional view of a fuel cell stack showing a process of replacing a membrane-electrode assembly using the replacement device according to the third exemplary embodiment.
Figure 11:
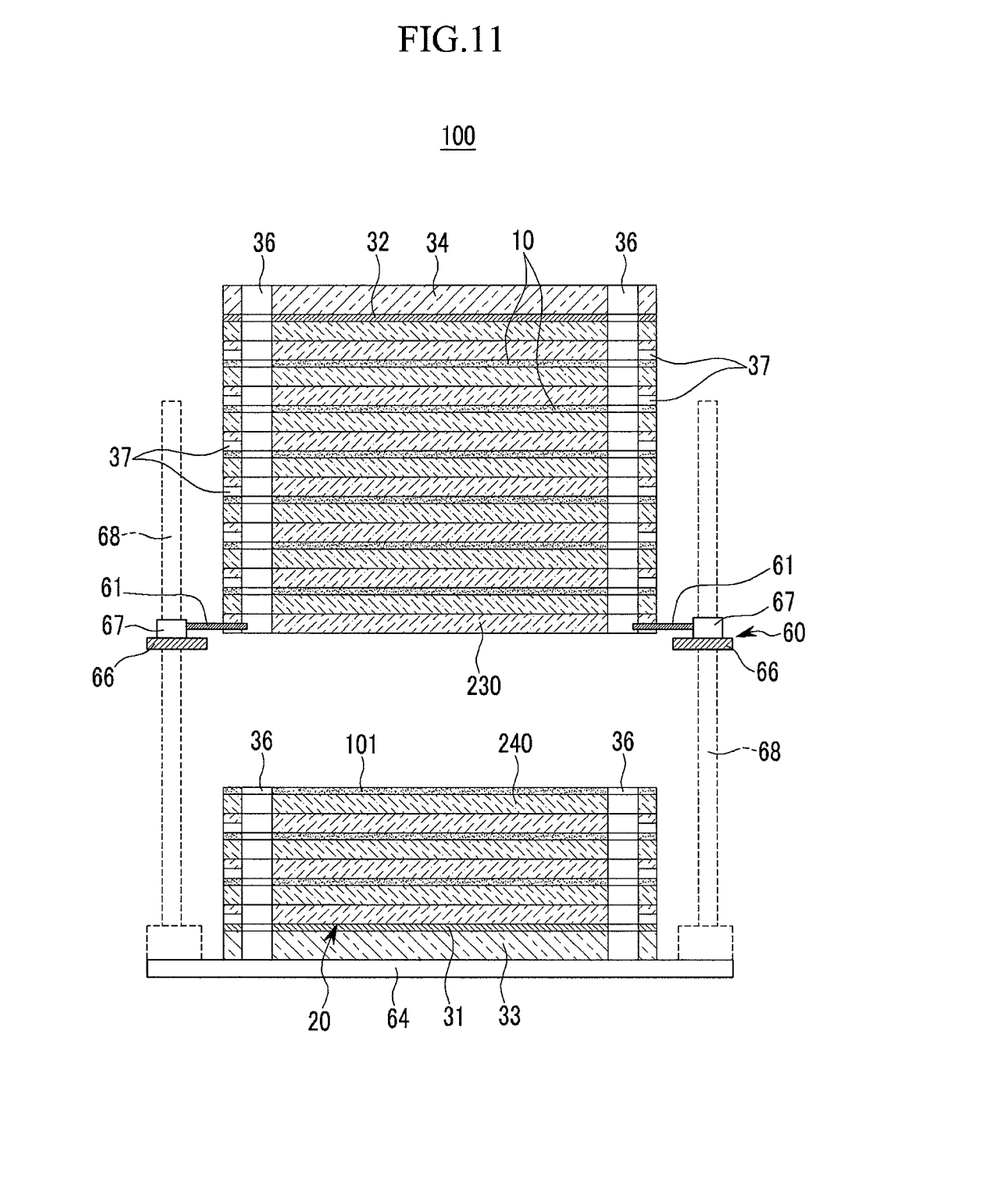
FIG. 11 is a cross-sectional view of a fuel cell stack showing a process of replacing a membrane-electrode assembly using the replacement device according to the third exemplary embodiment.

FIGS. 10 and 11 are cross-sectional views of a fuel cell stack showing a process of replacing a membrane-electrode assembly using the replacement device according to the third exemplary embodiment. Referring to FIGS. 9 to 11, the feed screws 68 are rotated by the operation of the driving motors 70 to move the support frame 66. When the fifth fixing pins 61 are in the same positions as the recess portions 37 of the first separator 230, the movement of the support frame 66 is stopped. Next, the fifth fixing pins 61 are moved forward toward the fuel cell stack 100 by the operation of the driving cylinders 67, and are fitted into the recess portions 37 of the first separator 230.

Next, the fastening members 40 are removed from the fuel cell stack 100, and the support frame 66 ascends to lift a portion of the fuel cell stack 100 that extends from the second end plate 34 to the first separator 230. Then, the replacement target 101 placed on the second separator 240 is exposed. The replacement target 101 may then be replaced with a new membrane-electrode assembly. After replacing the replacement target 101 with a new membrane-electrode assembly 10, the support frame 66 descends and the fuel cell stack 100 is reassembled by the fastening members 40. When the fifth fixing pins 61 are moved away from the fuel cell stack 100, the replacement process of the membrane-electrode assembly 10 is completed.

Figure 12:
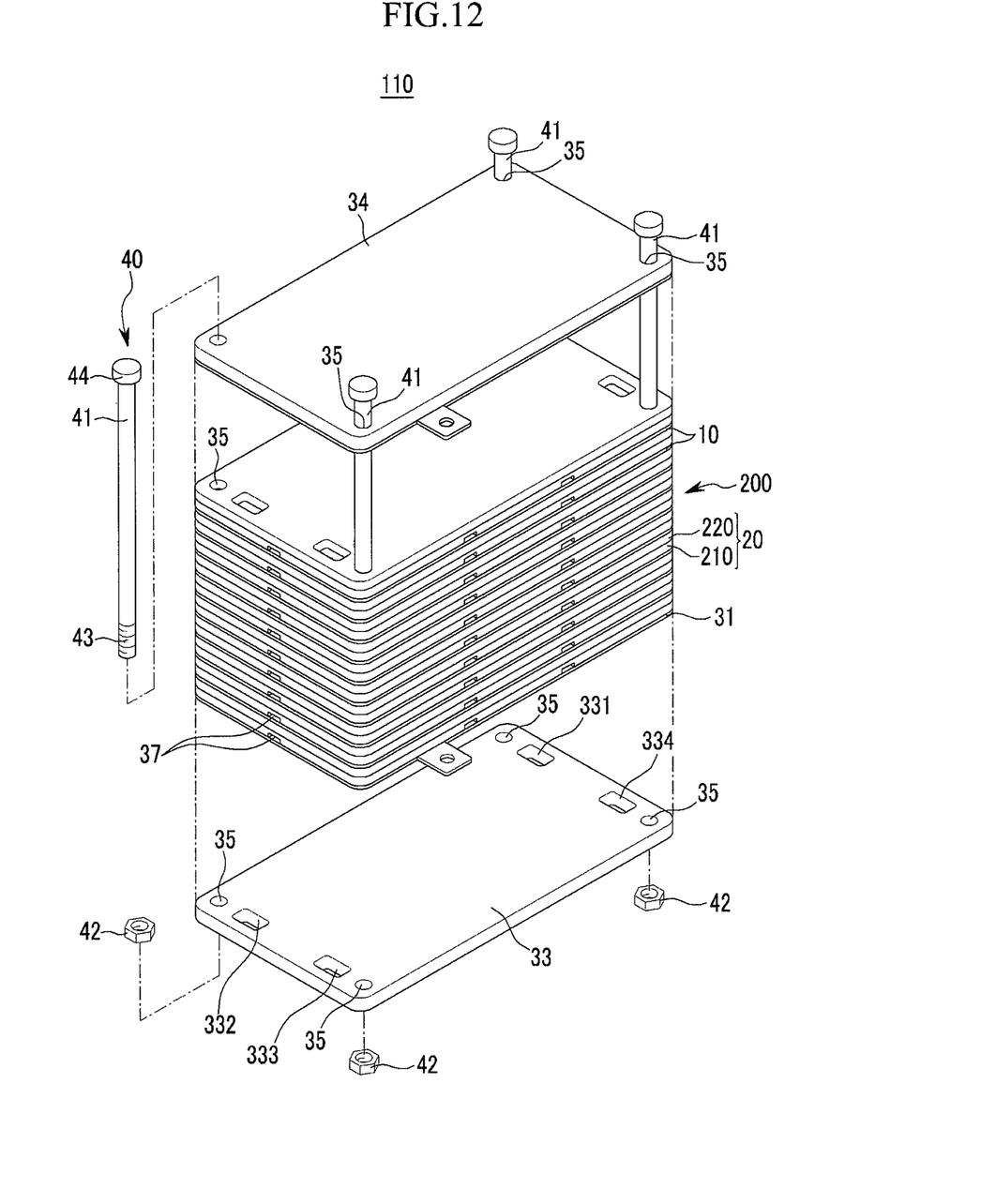
FIG. 12 is a perspective view of the fuel cell stack according to the second exemplary embodiment.

In the case of using the replacement device 60 of the third exemplary embodiment, the fuel cell stack 100 may not have replacement holes 36. FIG. 12 is a perspective view of the fuel cell stack according to the second exemplary embodiment. Referring to FIG. 12, the fuel cell stack 110 has the same configuration as the fuel cell stack of the first exemplary embodiment, except that it has no replacement holes. That is, the fuel cell stack 110 of the second exemplary embodiment has a plurality of recess portions 37 formed on side faces of each separator 20 to extend toward the inside of the separator 20. Even without the replacement holes 36, however, the replacement device 60 illustrated in FIG. 9 may be used to replace a replacement target 101 with the configuration of the fuel cell stack 110 illustrated in FIG. 12. The manner for using the replacement device 60 illustrated in FIG. 9 with the fuel cell stack illustrated in FIG. 12 may be similar to the process illustrated in FIGS. 10 and 11 and described above.

While the above-described invention has been described in connection with what is presently considered to be practical certain exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A system for replacing a membrane-electrode assembly of a fuel cell stack, the system comprising:
   a fuel cell stack comprising replacement holes penetrating a pair of end plates, membrane-electrode assemblies, separators and recess portions extending toward the replacement holes on side faces of the separators; and
   a replacement device comprising a first tie member inserted into a portion of the replacement holes and fastened to a first portion of the fuel cell stack located on a first side of a replacement target of the fuel cell stack, and a second tie member inserted into a remaining portion of the replacement holes and fastened to a second portion of the fuel cell stack located on the other side of the replacement target,
   wherein the first tie member comprises a first bolt having a first opening near one end thereof, a first fixing pin inserted into the first opening through a first recess portion of a first separator located on the first side of the replacement target, and a first nut fastened to the first bolt, and
   wherein the second tie member comprises a second bolt having a second opening near one end thereof, a second fixing pin inserted into the second opening through a second recess portion of a second separator located on the second side of the replacement target, and a second nut fastened to the second bolt.

2. The system of claim 1, wherein the length of the first fixing pin is greater than the sum of the length of the first opening and the length of the recess portions, and wherein the length of the second fixing pin is equal to the length of the first fixing pin.

3. The system of claim 2, wherein the first bolt is longer than the second bolt.

4. The system of claim 3, wherein the length of the first bolt is equal to the thickness of the fuel cell stack, and wherein the length of the second bolt is half the length of the first bolt.

5. The system of claim 1, wherein the first tie member comprises a first outer bolt fitted into the portion of the replacement holes, a first inner bolt screwed into the first outer bolt, and a third fixing pin installed near one end of the first outer bolt by a first elastic member, and wherein the second tie member comprises a second outer bolt fitted into the remaining portion of the replacement holes, a second inner bolt screwed into the second outer bolt, and a fourth fixing pin installed near one end of the second outer bolt by a second elastic member.

6. The system of claim 5, wherein the first outer bolt is longer than the second outer bolt.

7. The system of claim 6, wherein the length of the first outer bolt is equal to the thickness of the fuel cell stack, and wherein the length of the second outer bolt is half the length of the first outer bolt.

* * * * *